June 2, 1970  D. C. KILLION  3,515,428
RETRACTABLE TRUCK BODY COVER
Filed April 6, 1966  2 Sheets-Sheet 1
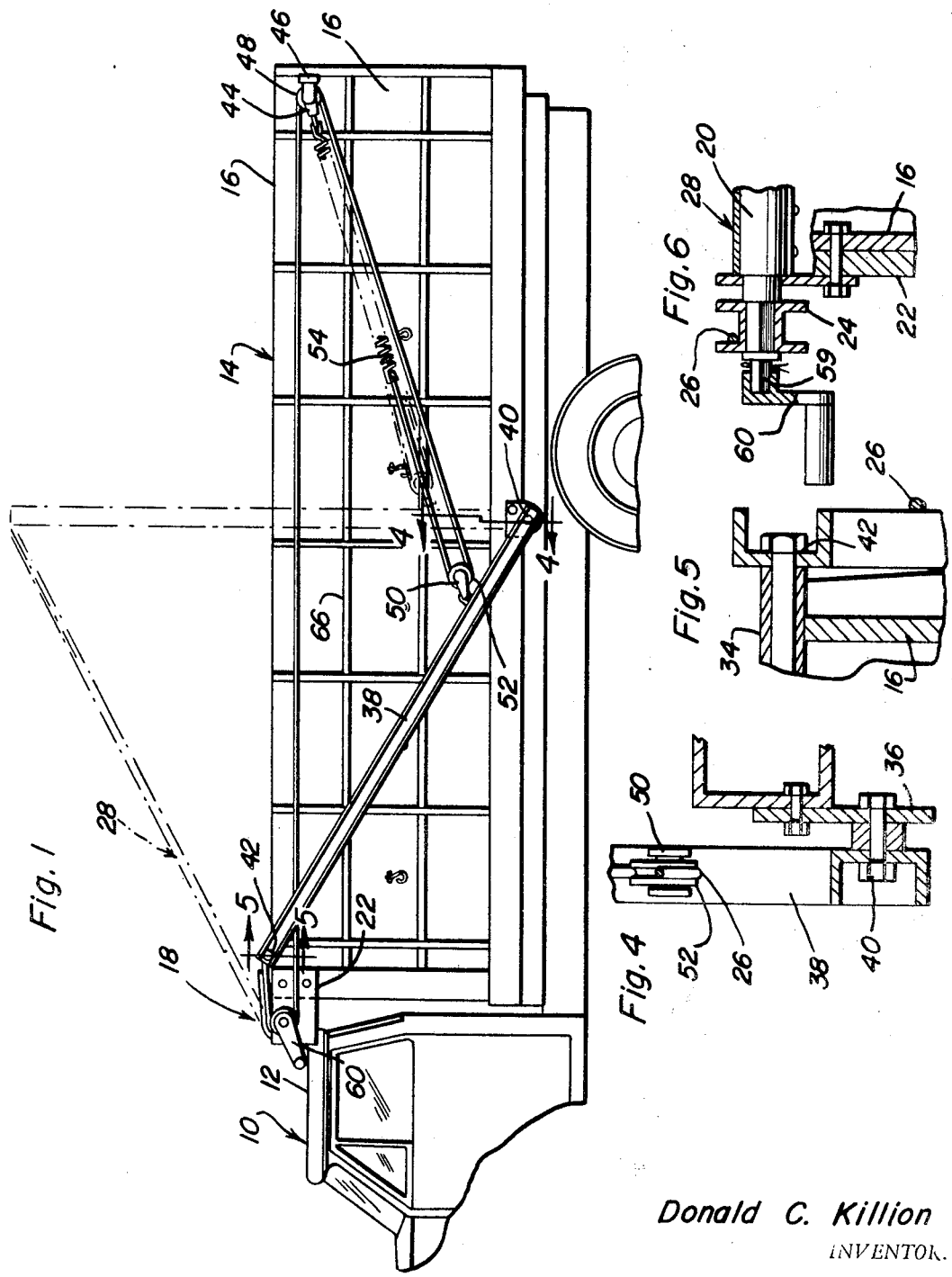
Donald C. Killion
INVENTOR.
BY
Attorneys June 2, 1970     D. C. KILLION     3,515,428
RETRACTABLE TRUCK BODY COVER
Filed April 6, 1966     2 Sheets-Sheet 2
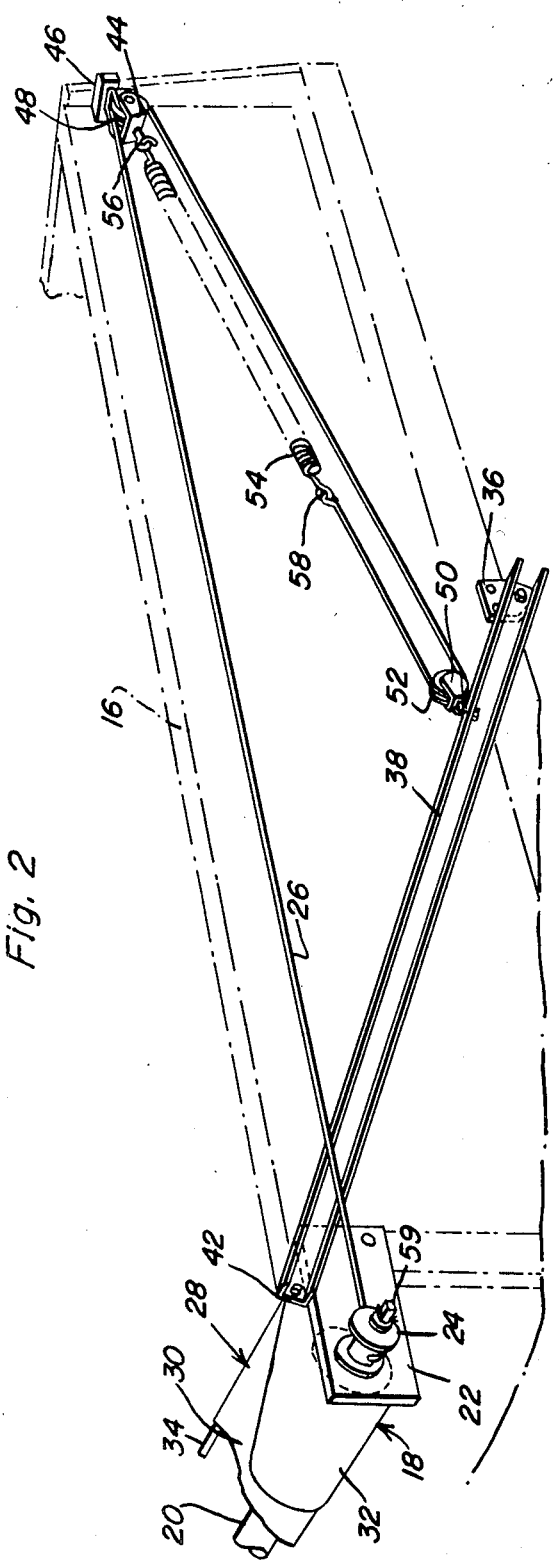
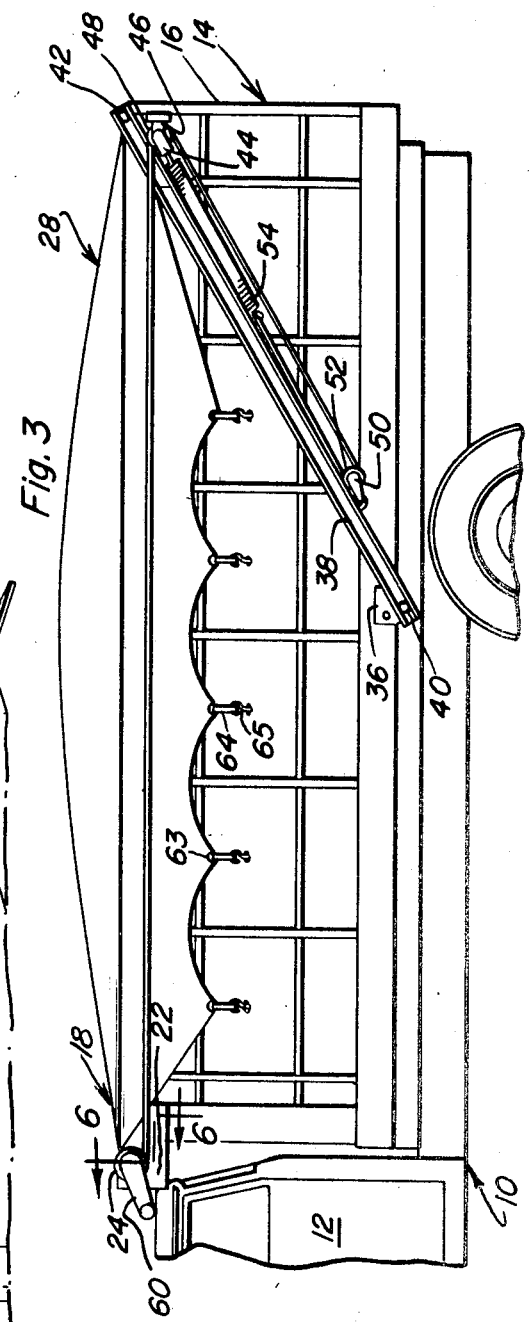
Donald C. Killion
INVENTOR.

United States Patent Office 3,515,428
Patented June 2, 1970

3,515,428
RETRACTABLE TRUCK BODY COVER
Donald C. Killion, 100 Riverview C,
Great Falls, Mont. 59401
Filed Apr. 6, 1966, Ser. No. 540,599
Int. Cl. B60p 7/04
U.S. Cl. 296—100                                   8 Claims

ABSTRACT OF THE DISCLOSURE

A generally horizontal load bed construction with an elongated flexible cover supported adjacent one end of the load bed for extension and retraction of one end of the cover toward and away from the other end of the load bed, the cover including drivable means operative to support and extend one end of the cover toward the other end of the load bed while maintaining the cover in a lengthwise tensioned condition and to elevate the extendible end of the cover relative to the load bed during its initial extension and to subsequently lower the extendible end of cover relative to the load bed during movement of the cover toward its fully extended position.

---

This invention relates to a novel and useful retractable load bed cover and more specifically to a flexible load bed cover adapted to be utilized in conjunction with a load bed of the type including a pair of upstanding sides, the load bed cover being retractable in nature and stored in a wound condition on a winding member extending across an upper portion of one end of the load bed and being extendible to an operative position with the free end of the flexible cover disposed over the upper portion of the other end of the load bed.

The load bed cover of the instant invention includes a winding member adapted to be journaled for rotation about an axis extending between one pair of corresponding end portions of the sides of a load bed and an elongated flexible cover panel has one end secured to the winding member for winding the cover thereon and unwinding the cover therefrom.

There are of course several types of flexible and retractable covers for load beds but most of these employ the use of tracks of some sort extending along the upper edges of the sides of the load bed having followers mounted thereon to which the free end portion of the retractable cover is secured. While this type of cover will operate efficiently as long as the load placed in the load bed does not project above the upper edges of the sides of the bed, should it be desired to carry a load within the load bed that projects above the sides of the load bed, this type of sliding flexible cover would engage the portions of the load projecting above the load bed sides and thereby be prevented from moving from a retracted position to a fully extended position.

In order to overcome this drawback of conventional sliding load bed covers, the load bed cover of the instant invention includes a pair of support arms having a first pair of corresponding end portions adapted to be pivotally secured to lower portions of the sides of a load bed centrally intermediate their opposite ends and a second pair of corresponding ends of the support arms swingable between first forwardly and upwardly inclined positions and second rearwardly and upwardly inclined positions, the free ends of the arms when disposed in the first positions thereof being disposed immediately adjacent the opposite ends of the winding member on which the load bed cover is wound and closely adjacent the opposite ends of the upper marginal edge portions of the sides of the load bed when in the second or operative positions. Of course, as the support arms swing between the first and second positions thereof, the free ends thereof are swung upwardly and rearwardly over any portion of the load within the load bed projecting above the sides of the load bed until such time as the arms are substantially vertically disposed and then continue to swing rearwardly and downwardly drawing the free end of the associated flexible cover down over the rear end of any portion of the load within the load bed projecting above the sides of the load bed.

The main object of this invention is to provide a flexible load bed cover for a load bed which is retractable in nature.

A further object of this invention, in accordance with the immediately preceding object, is to provide a retractable load bed cover which will be operative to be extended from a stored condition at one end of the load bed up and over any portion of a load projecting above the opposite sides of a load bed.

Yet another object of this invention is to provide a load bed cover of the aforementioned type including a winding member on which the load bed cover may be wound into a retracted inoperative position and support arms for the free edge portion of the flexible cover which are operatively connected to the winding member in such a manner that their free ends are swung toward the remote end of the load bed as the flexible cover is unwound from the winding member.

Yet another object of this invention is to provide means operatively connecting the winding member and the support arms and driving the latter from the former in a manner such that the support arms are biased toward their operative positions at a rate greater than the rate at which the flexible cover is unwound from the winding member thereby assuring that the flexible cover will be tensioned as it is unwound from the winding member.

A final object of this invention to be specifically enumerated herein is to provide a flexible cover for a load bed which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary side elevational view of a conventional form of truck shown with the retractable truck body cover of the instant invention operatively associated therewith;

FIG. 2 is a diagrammatical view in perspective of the operating mechanism of the truck body cover disposed on one side of the load bed;

FIG. 3 is a fragmentary side elevational view similar to that of FIG. 1 but shown with the retractable truck body cover in a fully extended position;

FIG. 4 is an enlarged fragmentary transverse vertical sectional view taken substantially upon the plane indicated by the section line 4—4 of FIG. 1;

FIG. 5 is an enlarged transverse vertical sectional view taken substantially upon the plane indicated by the section line 5—5 of FIG. 1; and FIG. 6 is an enlarged fragmentary transverse vertical sectional view taken substantially upon the plane indicated by the section line 6—6 of FIG. 3.

Referring now more specifically to the drawings, the numeral 10 generally designates a conventional form of truck including a cab portion 12 and a load bed defining portion generally referred to by the reference numeral 14. The load bed defining portion 14 includes a pair of upstanding opposite side walls 16, only one of which is shown, and the retractable truck body cover of the instant invention is generally referred to by the reference numeral 18.

As will be hereinafter more fully apparent only one side portion of the operating mechanism of the retractable truck body cover of the instant invention is specifically illustrated and described herein. However, it is to be understood that substantially all of the operating mechanisms specifically illustrated and described are provided in duplicate.

The retractable truck body cover 18 includes a winding member 20 whose opposite ends are journalled from suitable support brackets 22 secured to the upper front corners of the sides 16. The winding member 20 includes opposite end drums 24 which project outwardly of the support brackets 22 and have corresonding ends of a pair of elongated tension members 26 secured thereto. In addition, an elongated flexible cover panel generally referred to by the reference numeral 28 is provided and includes a center section 30 and a pair of opposite side extension sections or flaps 32. One end of the flexible cover panel 28 has the corresponding end of the center section 30 secured to the winding member 20 for winding thereon and the other end of the center section 30 is provided with a transverse stiffening member 34.

A pair of opposite side brackets 36 are secured to the lower marginal edge portions of the sides 16 centrally intermediate their opposite ends and one pair of corresponding ends of a pair of support arms 38 are pivotally supported from the brackets 36 by means of pivot fasteners 40.

The support arms 38 are swingable between the inoperative positions illustrated in solid lines in FIG. 1 of the drawings and operative positions illustrated in FIG. 3 of the drawings. It will be noted that the free ends of the support arms 38 rotatably receive the opposite ends of the stiffening member 34 as at 42 and that the support arms 38, when positioned as illustrated in solid lines in FIG. 1 of the drawings, have their free ends disposed closely adjacent the winding member whereby the flexible cover panel 28 may be substantially fully wound on the winding member.

A pulley block 44 is anchored to a support bracket 46 which projects outwardly of an upper rear corner portion of each side 16 and each pulley block 44 includes a pulley wheel 48 about which the free end portion of the corresponding tension member 26 is entrained. In addition, each of the support arms 38 has a pulley block 50 secured thereto and which includes a pulley wheel 52 about which the free end of the corresponding tension member 26 is also entrained. In addition, a pair of expansion springs 54 have one pair of corresponding ends anchored to the free ends of the tension members 26 as at 58 and the other pair of corresponding ends anchored to the corresponding pulley blocks 44 as at 56.

With attention again invited to FIG. 2 of the drawings, it may be seen that each end of the winding member 20 includes a noncircular projection 59 that projects outwardly of the corresponding drum 24 and is coaxial with the axis of rotation of the winding member 20. A crank handle 60 may be provided on each of the projections 59 for effecting rotation of the winding member 20.

Assuming first that the flexible cover panel 28 is in the fully retracted position illustrated in FIGS. 1 and 2 of the drawings, either of the crank handles 60 may be actuated to cause rotation of the winding member in a clockwise direction as viewed in FIGS. 1 and 2 of the drawings. As the winding member 20 is caused to rotate the drums 24 also rotate and wind thereon the associated ends of the tension members 26 whereby the support arms 38 are swung in a clockwise direction as viewed in FIGS. 1 and 2 of the drawings as the flexible cover panel 28 is unwound from the winding member.

From FIG. 1 of the drawings it may be seen that the support arms 38, when in an intermediate position between the two positions thereof illustrated in solid lines in FIGS. 1 and 3 of the drawings, project a substantial distance above the upper edge portions of the sides 16 and therefore that the leading edge of the flexible cover panel 28 being extended is swung upwardly and over any portion of a load within the load bed 14 which projects above the sides 16 thereof. Of course, as the support arms move from the phantom line position illustrated in FIG. 1 of the drawings to the position thereof illustrated in FIG. 3 of the drawings, the leading edge of the flexible cover panel 28 is swung downwardly and rearwardly into position closely overlying the upper portion of the rear of the load bed 14.

After the flexible cover panel 28 has been fully extended, the opposite side sections or flaps 32 thereof may have their free edge portions swung outwardly and downwardly so as to overlie the outer surface of the upper marginal edge portions of the sides 16. Further, from FIG. 3 of the drawings, it may be seen that each of the sections 32 includes longitudinally spaced gromets 63 and elongated strap means 64 having one set of ends secured to the gromets 63 and hooks 65 carried by the other set of ends releasably engaged with the correspondings sides 16 of the load bed 14 between the reinforcing stakes thereon. Further, the free end of the cover panel 28 secured to the stiffening member 34, when the cover panel 28 is fully extended, terminates at the rear end of the load bed 14 and need not be lapped over the rear end of the load bed. In this manner, and since the cover panel 28 is rolled from its front end, moisture from a damp roadway does not have an opportunity to soak the rear end of the panel 28 and the latter may be readily rolled into a stored condition without having to wait for a damp portion to dry.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a generally horizontal load bed including a pair of opposite upstanding sides, an open top, and opposite ends, an elongated flexible cover, means supporting said cover adjacent one end of said load bed for extension and retraction of one end of said cover toward and away from the other end of said load bed, said means including means operative to support and extend said one end of said cover toward said other end of said load bed while maintaining said cover in a lengthwise tensioned condition and to elevate said one end of said cover relative to said load bed during its initial extension and to subsequently lower said one end of said cover relative to said load bed during subsequent movement of said cover toward a fully extended position, said means including a winding member journaled from said one end of said load bed for rotation about an axis extending transversely of said load bed and to which the other end of said cover is secured for winding thereon, a pair of arm members supported from said load bed at one pair of corresponding ends for swinging movement of the other pair of corresponding ends through upstanding planes extending longitudinally of said load bed, said other ends of said arm members being swingable from first positions near said winding member upwardly and away from the latter toward second positions adjacent the other end portion of said load bed, means securing the free end portion of said cover to the other free ends of said arm members, said first mentioned means including means operative to swing said arm members from said first positions to said second positions, said last mentioned means including arm winging means connected between said winding member and said arm members yieldingly biasing said arm members toward said second positions in response to rotation of said winding member being rotated in a direction to unwind said flexible cover therefrom.

2. The combination of claim 1 wherein said arm swinging means includes elongated tension member means connected between said winding member and said arms.

3. The combination of claim 2 wherein said arm swinging means also includes expansion spring means operatively connected between said arms and said tension member means.

4. The combination of claim 1 wherein said flexible cover includes an elongated center section and longitundinally extending opposite side extension sections foldable over the opposite side marginal edge portions of said center section and swingable down over at least the upper portions of said sides when said cover is in its extended position.

5. The combination of claim 4 wherein the free marginal edge portions of said extension sections and said sides include coacting means operative to releasably secure said extension sections in overlying relation to at least the upper portions of the outer surfaces of said sides.

6. In combination with a load bed including a pair of upstanding sides, a retractable load bed cover assembly comprising a winding member journaled for rotation about an axis extending between one pair of corresponding end portions of said sides and disposed adjacent the upper edges thereof, an elongated flexible cover having one end secured on said winding member for winding thereon and unwinding therefrom, a pair of arm members pivotally supported at one pair of corresponding ends for rotation about axes generally paralleling said axis, spaced toward the other pair of end portions of said sides from said axis and below the latter, the other free ends of said arms being swingable to first positions adjacent the upper corner portions of said one end portions of said sides, means securing the free end portion of said cover to said free ends of said arms, the free ends of said arms being swingable from said first positions upwardly and toward the other pair of corresponding end portions of said side and into second positions with the free end of said cover disposed over the other pair of corresponding ends of said sides, arm swinging means connected between said winding member and said arms yieldingly biasing said arms toward said second positions in response to rotation of said winding member being rotated in a direction to unwind said flexible cover therefrom, said arm swinging means includes a pair of opposite end tension member winding sections on said winding member, a pair of elongated flexible tension members having one pair of ends wound on said opposite end winding sections, a pair of guides carried by the other pair of end portions of said sides, the free ends of said tension members being passed about said guides and operatively connected to said arms at points spaced from their axes of rotation.

7. The combination of claim 6 wherein said tension members having one pair of ends wound on said opposite their free ends operative to establish a lost motion connection between said arms and said opposite end winding sections.

8. The combination of claim 7 wherein said arms each have a pulley secured thereto about which the free end of corresponding tension member is entrained after passing about the corresponding guide, said expansion spring end sections being secured between said sides and the portions of said tension members passed about said pulleys.

References Cited

UNITED STATES PATENTS

| 989,422 | 4/1911 | Richards | 160—68 |
| 1,441,495 | 1/1923 | Galvin | 160—68 |
| 1,537,817 | 5/1925 | Figenbaum | 160—68 X |
| 2,591,186 | 4/1952 | Neitzke | 296—98 |
| 2,811,321 | 10/1957 | LaBarre | 296—98 X |
| 3,168,345 | 2/1965 | Roberts et al. | 296—100 |

BENJAMIN HERSH, Primary Examiner

R. R. SONG, Asssistant Examiner

U.S. Cl. X.R.

296—98